United States Patent [19]

Suzuki

[11] Patent Number: 5,461,616
[45] Date of Patent: Oct. 24, 1995

[54] ASYMMETRIC DIGITAL SUBSCRIBER LINE CONTROL SYSTEM

[75] Inventor: Hiroyuki Suzuki, Kawasaki, Japan

[73] Assignee: Fujitsu Limited, Kanagawa, Japan

[21] Appl. No.: 198,834

[22] Filed: Feb. 18, 1994

[30] Foreign Application Priority Data

Sep. 1, 1993 [JP] Japan .................................. 5-217116

[51] Int. Cl.⁶ .................................................. H04N 7/14
[52] U.S. Cl. ..................... 370/79; 370/85.7; 370/110.1; 348/14; 379/102
[58] Field of Search ................... 370/110.1, 79, 370/85.7, 85.9, 85.11; 348/7, 13, 14; 379/102, 105, 106

[56] References Cited

U.S. PATENT DOCUMENTS

| | | | |
|---|---|---|---|
| 4,763,191 | 8/1988 | Gordon et al. | 348/7 |
| 4,849,811 | 7/1989 | Kleinerman | 370/76 |
| 5,247,347 | 9/1993 | Litteral et al. | 379/105 |
| 5,305,318 | 4/1994 | Ozeki et al. | 370/110.1 |

*Primary Examiner*—Douglas W. Olms
*Assistant Examiner*—Min Jung

[57] ABSTRACT

An asymmetric digital subscriber line (ADSL) control system is adapted to transmit an audio signal and a control signal from at least one subscriber terminal to an exchange via a multiplexed line of an audio signal line, a control signal line and an image signal line, and to transmit an audio signal and an image signal from the exchange to the subscriber terminal. The ADSL control system includes a unit for allocating an unused image signal line between the subscriber terminal and the exchange to the control signal line from the subscriber terminal to the exchange, and a unit for allocating 2 lines for each subscriber terminal at the exchange.

6 Claims, 4 Drawing Sheets

FIG.4A

| VT#2-1 | VT#2-2 | ···VT#2-28, VT#3-1··· | VT#3-27 | VT#3-28 |
|---|---|---|---|---|

FIG.4B

IMAGE SIGNAL

| DSI#1 | DSI#2 | ------ | DSI#55 | DSI#56 |
|---|---|---|---|---|

FIG.4C

CONTROL SIGNAL

| DSI #1C | DSI #2C | ------ | DSI #55C | DSI #56C |
|---|---|---|---|---| ns 5,461,616

ASYMMETRIC DIGITAL SUBSCRIBER LINE CONTROL SYSTEM

BACKGROUND OF THE INVENTION

The present invention generally relates to asymmetric digital subscriber line control systems, and more particularly to an asymmetric digital subscriber line control system which effectively contains on the side of a feeder line an asymmetric digital subscriber line which makes a two-way transmission of an audio signal and a one-way transmission of an image signal to a subscriber.

Interactive television systems such as video-on-demand, network game, and home shopping systems have been proposed which use a switching network. For example, there is a proposed system which uses the existing telephone line, to make a two-way transmission of the audio signal at 3.4 kHz similarly as in the case of the normal telephone, and to transmit the image signal at 1.5 Mbps from an exchange to a subscriber and to transmit a control signal which requests the desired image signal at 16 kbps from the subscriber to the exchange. Such a subscriber line is called an asymmetric digital subscriber line (hereinafter simply referred to as an ADSL), and an economical configuration of such an ADSL is desirable.

FIG. 1 shows an example of a conventional system which uses the ADSL. The system shown in FIG. 1 includes a subscriber terminal 41, an exchange 42, and a remote station 43. The subscriber terminal 41 includes a telephone set 44, a monitoring television 45, an input operation unit 46, and a circuit terminating equipment 47. The exchange 42 includes a circuit terminating equipment 48 and a talk switch 49. An image providing unit 50 is formed by an image providing enterprise that provides movie programs and various kinds of image information, and sends a selected movie program or image information depending on a request from the subscriber.

In a case where the distance from the exchange 42 to the subscriber terminal 41 is short, no remote station 43 is provided, and the exchange 42 is connected directly to the subscriber terminal 41 via a line. On the other hand, in a case where the distance from the exchange 42 to the subscriber terminal 41 is long, the remote station 43 is provided as shown in FIG. 1. In actual practice, a plurality of subscriber terminals 41 are connected to this remote station 43.

A line DPL between the remote station 43 and each subscriber terminal 41 is referred to as a drop line, and a line FDL between the remote station 43 and the exchange 42 is referred to as a feeder line. The drop line DPL is formed by the existing telephone line which is made up of a twisted-wire cable, a coaxial cable, or a combination thereof. On the other hand, there are proposals to form the feeder line FDL by an optical fiber cable.

The input operation unit 46 of the subscriber terminal 41 is made up of a ten-key, a keyboard or the like, The circuit terminating equipment 47 is connected to the drop line DPL. The telephone set 44 can talk with an arbitrary subscriber. The monitoring television 45 receives the image signal from the image providing unit 50 and displays an image described by the image signal. The circuit terminating equipment 47 carries out the multiplexing and demultiplexing of the audio signal, the demultiplexing of the image signal, and multiplexing of the control signal.

On the other hand, the circuit terminating equipment 48 of the exchange 42 carries out the multiplexing and demultiplexing of the audio signal, the demultiplexing of a control signal CNTS from the subscriber terminal 41, and multiplexing of an image signal VDS to be transmitted to the subscriber terminal 41. If the feeder line FDL is formed by the optical fiber cable, the circuit terminating equipment 48 is provided with the functions of converting both optical and electrical signals. For example, a desired movie program out of the plurality of movie programs provided by the image providing unit 50 is selected based on the demultiplexed control signal CNTS.

For example, the image signal VDS may be coded by MPEG1 which is one of the color motion picture coding techniques which are proposed for standardization (International Standard IS11172 set by ISO in November 1992), so as to transmit the image signal VDS at a rate of 1.5 Mbps. The coded image signal may be transmitted using the existing telephone line by utilizing a 64-quadrature amplitude modulation (64-QAM). In addition, the control signal may be transmitted at a rate of 16 kbps, for example.

In the drop line DPL, the audio signal is transmitted in two directions, the image signal is transmitted in one direction towards the subscriber terminal 41, and the control signal is transmitted in one direction towards the exchange 42. In other words, not all transmissions via the drop line DPL are made in two directions, and some signals are transmitted in only one direction. This is the reason why such a drop line DPL is referred to as the ADSL.

On the other hand, in the feeder line FDL between the exchange 42 and the remote station 43, 3 lines made up of an audio signal line for transmitting the audio signal, an image signal line for transmitting the image signal and a control signal line for transmitting the control signal are allocated for each subscriber terminal 41 so as to transmit the multiplexed optical signal.

Therefore, at the exchange 42 and the remote station 43, it was necessary to allocate and process 3 lines associated with each subscriber terminal 41, that is, the audio signal line, the image signal line and the control signal line. For this reason, when the number of subscriber terminals 41 to be contained increases, the number of lines to be allocated increases considerably, and there was a problem in that it becomes necessary to expand the installations of the exchange 42 and the remote station 43. There was also a problem in that the system becomes expensive when such expansion of the installations is made.

SUMMARY OF THE INVENTION

Accordingly, it is a general object of the present invention to provide a novel and useful asymmetric digital subscriber line control system in which the problems described above are eliminated.

Another and more specific object of the present invention is to provide an asymmetric digital subscriber line control system adapted to transmit an audio signal and a control signal from at least one subscriber terminal to an exchange via a multiplexed line of an audio signal line, a control signal line and an image signal line, and to transmit an audio signal and an image signal from the exchange to the subscriber terminal, and comprising means for allocating an unused image signal line between the subscriber terminal and the exchange to the control signal line from the subscriber terminal to the exchange, and means for allocating 2 lines for each subscriber terminal at the exchange. According to the asymmetric digital subscriber line control system of the present invention, it is possible to improve the number of subscriber terminals that may be contained to 1.5 times compared to the conventional case where 3 lines are allocated to each subscriber terminal. Since the system cost evaluation is in general converted into the unit cost per line, the cost per line can be made ⅔ that of the conventional case by making the number of subscriber terminals that may be contained to 1.5 times. In other words, it is possible to considerably reduce the cost of the system employing the asymmetric digital subscriber line.

Other objects and further features of the present invention will be apparent from the following detailed description when read in conjunction with the accompanying drawings.

BRIEF DESCRIPTION OF THE DRAWINGS

FIGS. 4A, 4B and 4C respectively are diagrams for explaining the time slot allocation in the embodiment.

DESCRIPTION OF THE PREFERRED EMBODIMENTS

First, a description will be given of the operating principle of the present invention, by referring to FIG. 2.

Figure 1:
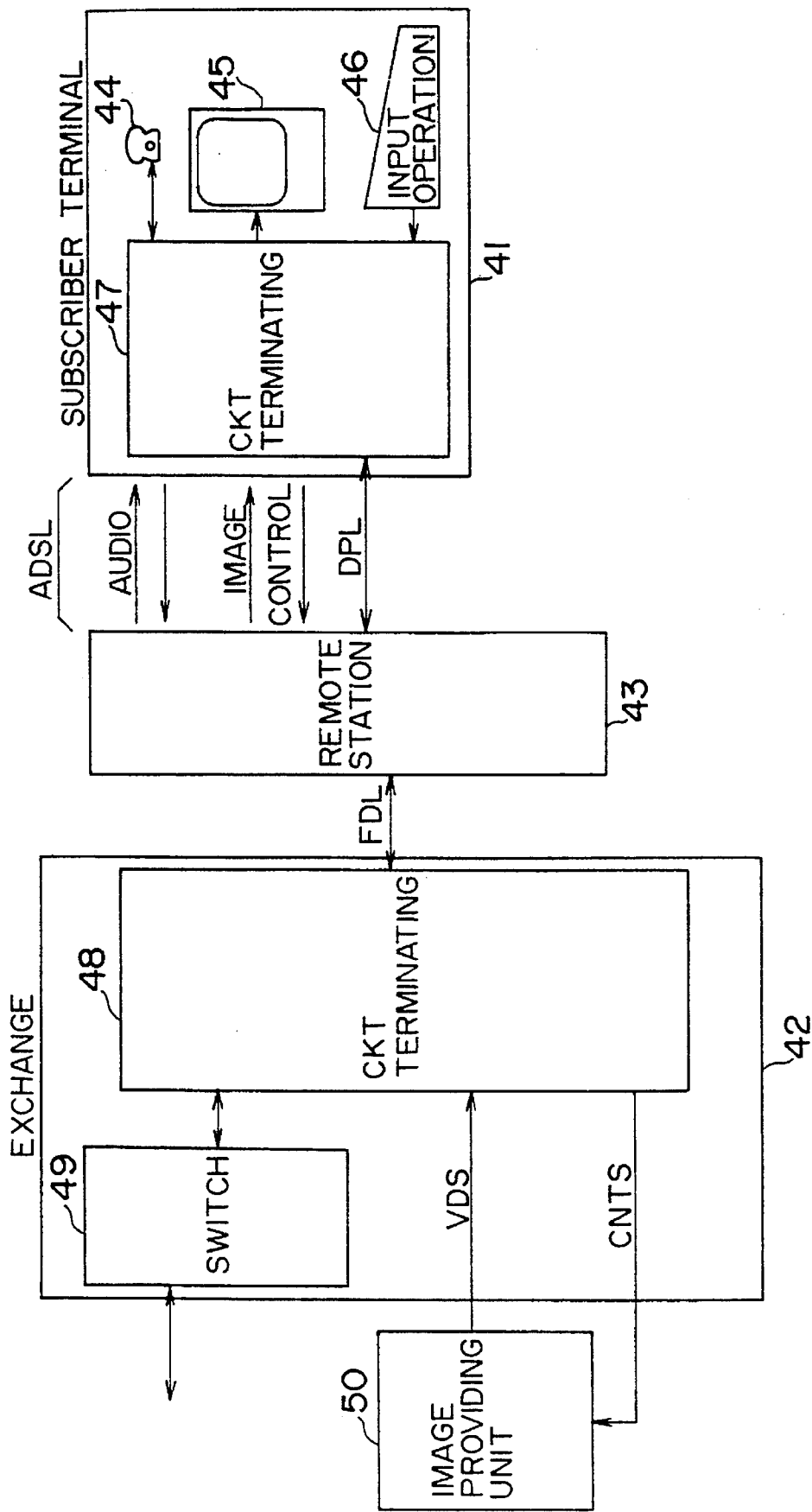
FIG. 1 is a system block diagram showing an example of a conventional system which uses an ADSL.
Figure 2:
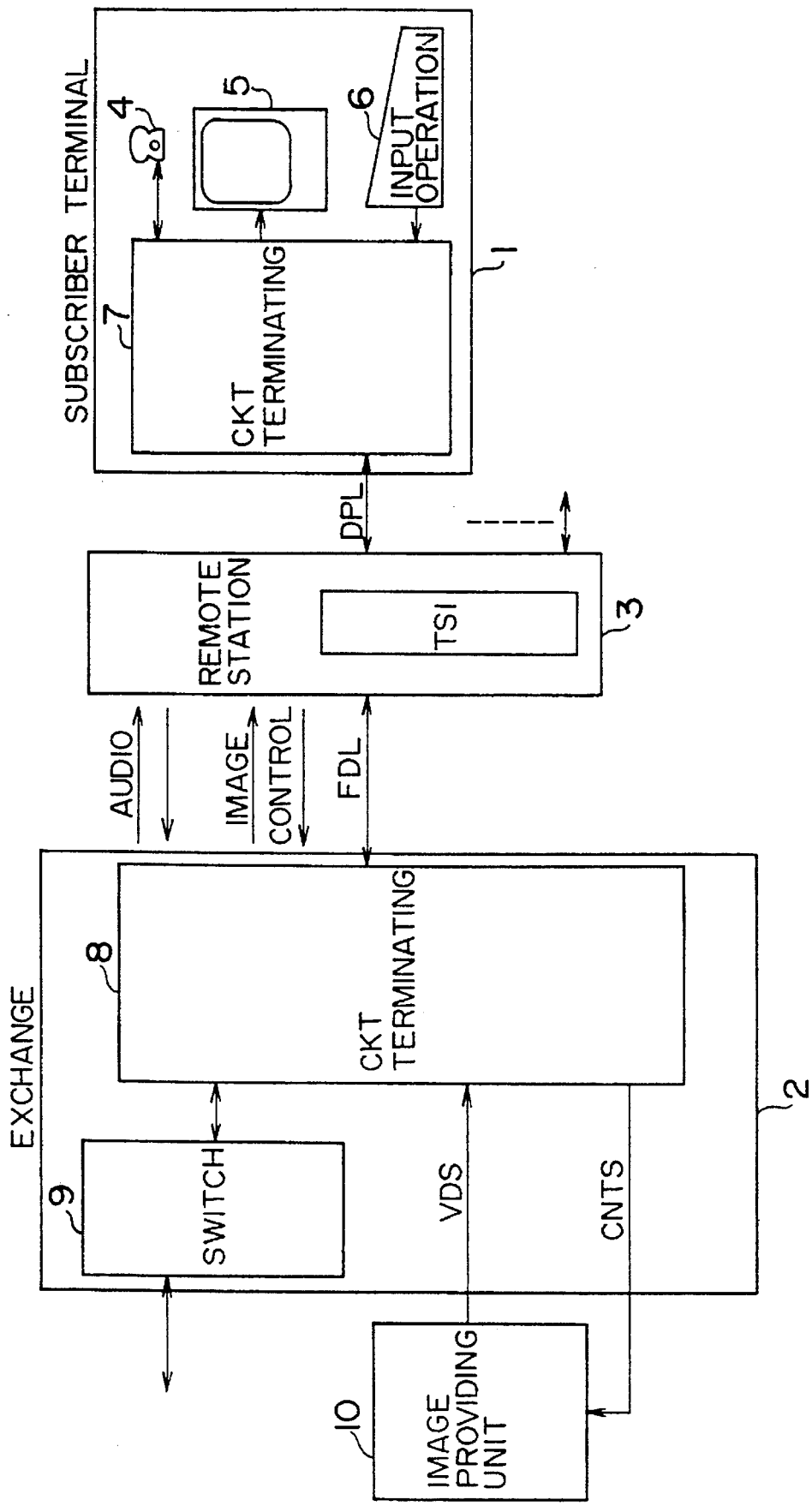
FIG. 2 is a system block diagram for explaining the operating principle of the present invention.

A system shown in FIG. 2 to which the present invention is applied includes a subscriber terminal 1, an exchange 2, and a remote station 3. The subscriber terminal 1 includes a telephone set 4, a monitoring television 5, an input operation unit 6, and a circuit terminating equipment 7. On the other hand, the exchange 2 includes a circuit terminating equipment 8 and a talk switch 9. An image providing unit 10 which is connected to the exchange 2 provides image information. The remote station 3 is provided when the subscriber terminal 1 and the exchange 2 are distant from each other.

An audio signal and a control signal is transmitted from the subscriber terminal 1 to the exchange 2 and the audio signal and an image signal are transmitted from the exchange 2 to the subscriber terminal 1, respectively via a line in which an audio signal line, a control signal line and an image signal line are multiplexed.

According to the asymmetrical digital subscriber line control system of the present invention, the unused image signal line from the subscriber terminal 1 to the exchange 2 is allocated to the control signal line from the subscriber terminal to the exchange 2, so as to allocate 2 lines for each subscriber terminal 1 at the exchange 2.

The control signal from the subscriber terminal 1 may be mapped to a transmission format of the image signal line and transmitted to the exchange 2.

In addition, it is possible to connect a plurality of subscriber terminals 1 to the exchange 2 via the remote station 3, and to allocate the image signal which is to be transmitted to the subscriber terminal 1 and the control signal which is to be transmitted to the exchange 2 to a pair of time slots between the exchange 2 and the remote station 3.

Moreover, it is possible to provide a time slot interchange unit TSI in the remote station 3. In this case, the time slots of the image signal and the control signal can be allocated by the time slot interchange unit TSI depending on a request from the subscriber terminal 1.

Furthermore, it is possible to connect a feeder line FDL between the exchange 2 and the remote station 3 by a line using an optical signal, and to connect a drop line DPL between the remote station 3 and each of the subscriber terminals 1 by a line using an electrical signal. In this case, a multiplexed processing of the audio signal, the image signal and the control signal can be made at the remote station 3 with respect to the subscriber terminals 1.

No control signal is transmitted from the exchange 2 to the subscriber terminal 1. On the other hand, no image signal is transmitted from the subscriber terminal 1 to the exchange 2. Hence, the image signal line from the subscriber terminal 1 to the exchange 2 is unused. Hence, by allocating this unused image signal line to the control signal line for transmitting the control signal from the subscriber terminal 1 to the exchange 2, the exchange 2 need only allocate and process 2 lines for each subscriber terminal 1. In other words, although 3 lines are conventionally allocated and processed for each subscriber terminal, the present invention only allocates and processes 2 lines for each subscriber terminal 1. For this reason, the present invention can increase the number of subscriber terminals 1 that can be contained to 1.5 times without expanding the installations.

In addition, when transmitting the image signal in the form of a standardized DS-1 signal having a rate of 1.544 Mbps, for example, the control signal can be mapped to the format of this DS-1 signal and transmitted. This DS-1 signal has 1 frame of 125 μs, and has a frame structure of 8 bits×24 channels+1 bit.

On the other hand, when the remote station 3 is provided and a plurality of subscriber terminals 1 are respectively connected to this remote station 3 via the drop line DPL, a pair of time slots are allocated to the image signal with respect to each subscriber terminal 1 and the control signal and processed in the feeder line FDL between the exchange 2 and the remote station 3.

In addition, the time slots of the image signal and the control signal can be allocated by the time slot interchange unit TS1 of the remote station 3 depending on a request from the subscriber terminal 1. Hence, only the audio signal line is allocated to the subscriber terminal 1 which makes the call via the telephone set 4. When a control signal requesting the image is transmitted from the input operation unit 6, a pair of time slots of the image signal and the control signal is allocated to each subscriber terminal 1.

The feeder line FDL between the exchange 2 and the remote station 3 is formed by an optical fiber cable and a multiplexed optical signal is transmitted via this optical fiber cable. The drop line DPL between the remote station 3 and each subscriber terminal 1 is formed by the existing telephone line or the like. Hence, a demultiplexing is carried out in the remote station 3 to transmit the audio signal and the image signal to the subscriber terminal 1, and the audio signal and the control signal are multiplexed and transmitted to the exchange 2 in the form of an optical signal from the plurality of subscriber terminals 1.

Figure 3:
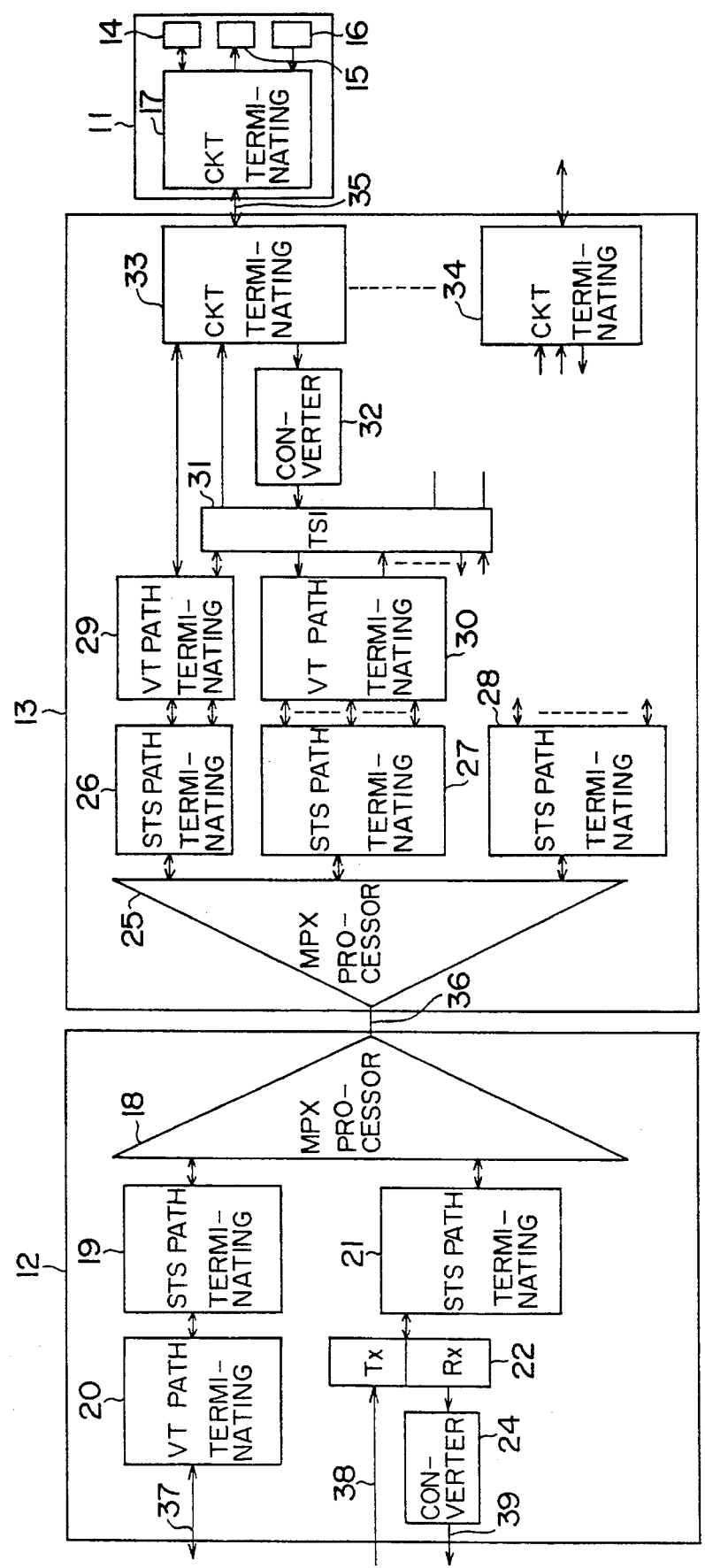
FIG. 3 is a system block diagram showing an embodiment of an asymmetric digital subscriber line control system according to the present invention.

Next, a description will be given of an embodiment of an asymmetric digital subscriber line control system according to the present invention. FIG. 3 shows this embodiment, and FIGS. 4A through 4C are diagrams for explaining the time slot allocation in this embodiment.

A system shown in FIG. 3 to which this embodiment is applied includes a subscriber terminal 11, an exchange 12, and a remote station 13. The subscriber terminal 11 includes a telephone set 14, a monitoring television 15, an input operation unit 16, and a circuit terminating equipment 17. On the other hand, the exchange 12 includes a multiplexing processor 18, STS path terminating equipments 19 and 21, VT path terminating equipments 20 and 22, and a converter 24. The remote station 13 includes a multiplexing processor 25, STS path terminating equipments 26, 27 and 28, VT path terminating equipments 29 and 30, a time slot interchange unit (TSI) 31, a converter 32, and circuit terminating equipments 33 and 34.

The subscriber terminal 11 and the remote station 13 are connected via a drop line 35, and the remote station 13 and the exchange 12 are connected via a feeder line 36. An audio signal line 37 is connected to the VT path terminating equipment 20 of the exchange 12, and an image signal line 38 is connected to the VT path terminating equipment 22 of the exchange 12. In addition, a control signal line 39 is connected to the converter 24 of the exchange 12.

Each of the constituent elements of the subscriber terminal 11, the exchange 12 and the remote station 13 can be realized by known circuits, the processing functions of known processors or the like.

In this embodiment, the feeder line 36 between the exchange 12 and the remote station 13 is formed by the optical fiber cable, and a standardized 150 Mbps OC-3 signal (optical signal) is transmitted via this optical fiber cable. The drop line 35 between the remote station 13 and each subscriber terminal 11 is formed by the existing telephone line. For example, the audio signal is transmitted at 64 kbps in both directions via this drop line 35, a standardized 1.544 Mbps DS-1 signal (standard TR-NWT-000253 set by Bellcore) is transmitted in one direction from the remote station 13 to the subscriber terminal 11 as the image signal, and the control signal is transmitted at 16 kbps in one direction from the subscriber terminal 11 to the remote station 13. Accordingly, the drop line 35 forms the asymmetrical digital subscriber line (ADSL).

In addition, the circuit terminating equipment 17 of the subscriber terminal 11 transmits the audio signal from the telephone set 14 and the control signal such as the image request from the input operation unit 16 to the remote station 13 via the drop line 35. On the other hand, the circuit terminating equipment 17 transmits the audio signal received from the remote station 13 via the drop line 35 to the telephone set 14, and transmits the image signal received from the remote station 13 via the drop line 35 to the monitoring television 15. The circuit terminating equipments 33 and 34 of the remote station 13 supply the audio signal from the subscriber terminal 11 to the VT path terminating equipment 29, and transmit the audio signal from the VT path terminating equipment 29 to the subscriber terminal 11. A plurality of circuit terminating equipments 33 and 34 are provided in correspondence with the plurality of subscriber terminals 11. In addition, a plurality of time slot interchange units 31 and a plurality of VT path terminating equipments 30 are also provided in correspondence with the subscriber terminals 11. However, only a portion of the remote station 13 is shown in FIG. 3 for the sake of convenience.

The circuit terminating equipment 33 maps the control signal from the subscriber terminal 1 to the transmission format of the DS-1 signal received from the converter 32. In other words, the control signal is converted into the DS-1 signal and supplied to the time slot interchange unit 31. This time slot interchange unit 31 supplies the image signal of the time slot allocated to the subscriber terminal 11 to the circuit terminating equipment 33, and inserts the control signal in the time slot which forms the pair with the time slot of this image signal. In other words, since the image signal line from the subscriber terminal 11 to the exchange 12 is unused, the control signal line is allocated to this image signal line.

In this embodiment, a VT signal between the VT path terminating equipment 29 and the STS path terminating equipment 26 and between the VT path terminating equipment 30 and the STS path terminating equipment 27 is transmitted at 1.7 Mbps. In addition, an STS signal (STS-1) between the STS path terminating equipments 26, 27 and 28 and the multiplexing processor 25 is transmitted at 51.8 Mbps. Further, an OC-1 signal (optical signal) is transmitted at 150 Mbps via the feeder line 36 between the multiplexing processors 18 and 25. In this case, the multiplexing processors 18 and 25 include a semiconductor laser for converting an electrical signal into an optical signal and a photodiode or the like which converts the optical signal into the electrical signal.

The exchange 12 makes a switching between another subscriber by using a construction which includes a talk switch or, by connecting the audio signal line 37 to another exchange which is not shown in FIG. 3. In addition, the image signal line 38 and the control signal line 39 are connected to an image providing unit which is not shown in FIG. 3. In this case, the converter 24 which is connected to the control signal line 39 separates the control signal which is mapped to the DS-1 signal from a receiver Rx of the VT path terminating equipment 22, and converts the control signal back to the original signal. In other words, the converter 24 carries out a process complementary to the process carried out by the converter 32 of the remove station 13. On the other hand, the image signal which is to be transmitted to the subscriber terminal 11 is supplied to the STS path terminating equipment 21 via a transmitter Tx of the VT path terminating equipment 22 and is thereafter multiplexed by the multiplexing processor 18. Hence, the image signal is transmitted from the multiplexing processor 18 to the remote station 12 as the OC-3 signal via the feeder line 36.

As described above, only 2 lines, namely, the audio signal line and the image signal line, need to be allocated and processed in the exchange 12 and the remote station 13 for each subscriber terminal 11. Compared to the conventional case where 3 lines are allocated and processed, this embodiment can contain 1.5 times more subscriber terminals 11. In addition, since the time slot of the image signal can be allocated to only the subscriber terminal 11 which requests the image signal by use of the time slot interchange unit 31, it is possible to effectively utilize the image signal line. Moreover, because the remote station 13 and each subscriber terminal 11 can be connected by use of the existing telephone line, it is easy to design and build the system. Furthermore, by transmitting optical signals between the remote station 13 and the exchange 12, it is possible to contain a large number of subscribers 11 by the remote station 13 and easily transmit signals having a large multiplexing factor.

FIGS. 4A, 4B and 4C are diagrams for explaining the time slot allocation of this embodiment. FIG. 4A shows time slots VT#2-1 through VT#2-28 and VT#3-1 through VT#3-28 of the VT signal level. FIG. 4B shows time slots DS1#1 through DS1#56 of the DS-1 signal level for transmitting the image signal from the exchange 12 to the remote station 13. FIG. 4C shows time slots DS1#1C through DS1#56C of the DS-1 signal level for transmitting the control signal from the remote station 13 to the exchange 12. For example, when transmitting the image signal by allocating the time slot DS1#1 with respect to the subscriber 11 to the time slot VT#2-1 of the VT signal level, the time slot DS1#1C which forms a pair with the time slot DS1#1 is allocated with respect to the control signal from this subscriber 11. Accordingly, when an interchange process is carried out by the time slot interchange unit 31 with respect to the pair between the VT path terminating equipment 30 and the circuit terminating equipment 33, it becomes possible to transmit the control signal and the image signal with respect to the subscriber terminal which made the image request.

Of course, the time slot interchange unit 31 of the remote station 13 or the like may be omitted to simplify the construction. On the other hand, it is possible to construct the exchange 12 so that a plurality of image providing units can be switched and connected thereto. In other words, it is possible to connect to the exchange 12 an image providing unit depending on the request from the subscriber terminal 11 and to request a desired image with respect to this image providing unit from the subscriber terminal 11.

Further, the present invention is not limited to these embodiments, but various variations and modifications may be made without departing from the scope of the present invention.

What is claimed is:

1. An asymmetric digital subscriber line control system for transmitting an audio signal and a control signal from at least one subscriber terminal to an exchange via a two-way transmission multiplexed line of an audio signal line, a control signal line and an image signal line, and for transmitting an audio signal and an image signal from the exchange to the subscriber terminal, wherein an image signal line from the subscriber terminal to the exchange is unused, said asymmetric digital subscriber line control system comprising:

means for allocating the unused image signal line from the subscriber terminal to the exchange to transmit the control signal from the subscriber terminal to the exchange so as to use said unused image signal line from the subscriber terminal to the exchange as the control signal line; and means for allocating two lines for each subscriber terminal at the exchange, said two lines including said unused image signal line.

2. The asymmetric digital subscriber line control system as claimed in claim 1, which further comprises:

means for transmitting the control signal from the subscriber to the exchange by mapping the control signal into a transmission format of the image signal line.

3. The asymmetric digital subscriber line control system as claimed in claim 2, which is adapted to a system which includes a remote station via which the exchange is coupled to a plurality of subscriber terminals, and which further comprises:

means for allocating a pair of time slots to the image signal which is to be transmitted to an arbitrary one of the subscriber terminals and is transmitted between the exchange and the remote station, and the control signal which is to be transmitted to the exchange.

4. The asymmetric digital subscriber line control system as claimed in claim 1, which is adapted to a system which includes a remote station via which the exchange is coupled to a plurality of subscriber terminals, and which further comprises:

means for allocating a pair of time slots to the image signal which is to be transmitted to an arbitrary one of the subscriber terminals and is transmitted between the exchange and the remote station, and the control signal which is to be transmitted to the exchange.

5. The asymmetric digital subscriber line control system as claimed in claim 4, which further comprises:

a time slot interchange unit, provided in the remote station, for allocating the time slots of the image signal and the control signal depending on a request received from one of the subscriber terminals.

6. The asymmetric digital subscriber line control system as claimed in claim 4, wherein the exchange and the remote station are coupled via a line for an optical signal, and the remote station and the plurality of subscriber terminals are respectively coupled via a line for an electrical signal, and which further comprises:

means, provided in the remote station, for multiplexing the control signal, the image signal and the audio signal between each of the plurality of subscriber stations.

* * * * *